(12) United States Patent
Hong et al.

(10) Patent No.: US 9,311,561 B2
(45) Date of Patent: Apr. 12, 2016

(54) HISTOGRAM EQUALIZATION APPARATUS USING HISTOGRAM COMPRESSION

(71) Applicant: INDUSTRY FOUNDATION OF CHONNAM NATIONAL UNIVERSITY, Gwangju (KR)

(72) Inventors: Sung Hoon Hong, Gwangju (KR); Jong In Kim, Gwangju (KR); Jae Won Lee, Gwangju (KR)

(73) Assignee: Industry Foundation of Chonnam National University, Gwangju (KR)

( * ) Notice: Subject to any disclaimer, the term of this patent is extended or adjusted under 35 U.S.C. 154(b) by 0 days.

(21) Appl. No.: 14/425,974

(22) PCT Filed: Oct. 1, 2013

(86) PCT No.: PCT/KR2013/008795
§ 371 (c)(1),
(2) Date: Mar. 4, 2015

(87) PCT Pub. No.: WO2014/208817
PCT Pub. Date: Dec. 31, 2014

(65) Prior Publication Data
US 2015/0294180 A1 Oct. 15, 2015

(30) Foreign Application Priority Data
Jun. 28, 2013 (KR) .......................... 10-2013-0075249

(51) Int. Cl.
G06K 9/46 (2006.01)
H04N 5/217 (2011.01)
G06T 5/00 (2006.01)
G06T 5/40 (2006.01)
G06K 9/52 (2006.01)

(52) U.S. Cl.
CPC ............ *G06K 9/4642* (2013.01); *G06K 9/4661* (2013.01); *G06K 9/52* (2013.01); *G06T 5/009* (2013.01); *G06T 5/40* (2013.01); *H04N 5/217* (2013.01)

(58) Field of Classification Search
None
See application file for complete search history.

(56) References Cited

U.S. PATENT DOCUMENTS 8,144,985 B2 3/2012 Ciurea et al.
8,339,475 B2 12/2012 Atanassov et al.
(Continued)

FOREIGN PATENT DOCUMENTS

KR 10-2011-0105831 A 9/2011
KR 10-2012-0060278 A 6/2012

OTHER PUBLICATIONS

Wang Bing-jjan et al., "A real-time contrast enhancement algorithm for infrared images based on plateau histogram", Infrared Physics & Technology, Apr. 2006, pp. 77-82, vol. 48, No. 1.
(Continued)

*Primary Examiner* — Sean Motsinger
(74) *Attorney, Agent, or Firm* — Rabin & Berdo, P.C.

(57) ABSTRACT

The present invention relates to a histogram equalization apparatus using histogram compression, and the objective of the present invention is to provide an equalization apparatus which highly compresses a histogram of an input image having a brightness level with a high frequency and lowly compresses the histogram having a brightness level with relatively a lower frequency thereby maintaining the characteristics of the input image, while refraining excessive changes in brightness, and enhancing the contrast more effectively by controlling the strength of a compression ratio according to the characteristics of the input image.
To this end, the present invention comprises: a histogram calculation unit for calculating the histogram of the input image; a parameter determination module for determining a histogram compression ratio parameter ($\lambda$) according to a brightness value of the input image or the characteristics of the histogram; a histogram transformation unit for compressing the input histogram according to the histogram compression ration parameter ($\lambda$) determined by the parameter determination module so as to obtain a compressed histogram, obtaining a modified histogram, and calculating a cumulative distribution function of the modified histogram; and a histogram equalization unit for performing a histogram equalization by obtaining a modified histogram equalization map.

7 Claims, 4 Drawing Sheets

(56) References Cited

U.S. PATENT DOCUMENTS

| | | |
|---|---|---|
| 8,774,554 B1* | 7/2014 | Winn .................. 382/274 |
| 2003/0152283 A1* | 8/2003 | Moriwaki ............. 382/274 |
| 2004/0161161 A1* | 8/2004 | Recht .................. 382/257 |
| 2006/0165305 A1 | 7/2006 | Hasebe et al. |
| 2007/0165947 A1* | 7/2007 | Paik .................... 382/169 |
| 2008/0310714 A1* | 12/2008 | Stern et al. ........... 382/169 |
| 2009/0161953 A1 | 6/2009 | Ciurea et al. |
| 2010/0157078 A1 | 6/2010 | Atanassov et al. |
| 2012/0328186 A1 | 12/2012 | Roux et al. |
| 2013/0121576 A1 | 5/2013 | Hsu |

OTHER PUBLICATIONS

Nicholas Sia Pik Kong et al., "Enhancement of Microscopic Images Using Modified Self-Adaptive Plateau Histogram Equalization", Proceedings of 2009 International Conference on Graphic and Image Processing (ICGIP 2009), Kota Kinabalu, Nov. 2009.

Seungjoon Yang et al., "Contrast Enhancement Using Histogram Equalization with Bin Underflow and Bin Overflow", 2003 International Conference, Sep. 2003, pp. 881-884, vol. 1.

Qing Wang et al., "Fast Image/Video Contrast Enhancement Based on Weighted Thresholded Histogram Equalization", IEEE Trans on Consumer Electronics, May 2007, pp. 757-764, vol. 53, No. 2.

Taekyung Kim et al., "Adaptive Contrast Enhancement Using Gain-Controllable Clipped Histogram Equalization", IEE Trans on Consumer Electronics, Nov. 2008, pp. 1803-1810, vol. 54, No. 4.

Chen Hee Ooi et al., "Bi-Histogram Equalization with a Plateau Limit for Digital Image Enhancement", IEEE Transactions on Consumer Electronics, Nov. 2009, pp. 2072-2080, vol. 55, No. 4.

Chen Hee Ooi et al., "Quadrants Dynamic Histogram Equalization for Contrast Enhancement", IEEE Transactions on Consumer Electronics, Nov. 2010, pp. 2552-2559, vol. 56, No. 4.

* cited by examiner

HISTOGRAM EQUALIZATION APPARATUS USING HISTOGRAM COMPRESSION

TECHNICAL FIELD

The present invention relates to a histogram equalization apparatus using histogram compression, and more particularly to an equalization apparatus and histogram modification for enhancing naturally the contrast of an image and restraining distortion problem such as loss of detailed information of in image, false contouring, and over-enhancement appearing in an image of which the contrast was improved by using the conventional histogram equalization method.

BACKGROUND ART

Recently, a lot of image-processing technologies have been developed in order to obtain the image of superior quality in various backgrounds and environments, as the demand is growing for a high performance image processing equipment. However, an image sensor, the core of image processing equipment, has limitation of resolution and dynamic range. The dynamic range to which an image sensor reacts is narrower than one of actual input image recognized by human eyes. Thus, it causes the loss of image information. Consequently, that is the reason why the image seen by human eyes looks different from the image acquired by the image sensor. In addition, in case that there is dark lighting or backlight in the image, precise information may not be recognized.

In order to solve these problems, various studies for improving contrast are in progress. A representative method for improving contrast is a histogram equalization method, and there are various studies for methods modified from the histogram equalization. However, in case that the histogram of an input image is distributed intensively on the specific brightness value, over-enhancement and false contouring occur and contrast improvement enhancement is not performed for brightness value corresponding to histogram of less frequency or the relevant brightness value disappears. Thus, it is observed that detailed information of small area of images is lost.

In reference to technology for image improvement, Korean Patent Publication 10-2012-0060278 (hereinafter, 'prior art') and etc. were disclosed. The prior art above generates a histogram of an input image, adjusts image brightness by adapting histogram equalization to the input image based on cumulative distribution function of the histogram. But, in the prior art above, there is no description about the method in that compression ratio is determined by the characteristic of a histogram or a brightness value of the input image and the histogram is compressed.

Meanwhile, as a representative method for preventing excessive change of image brightness by over-enhancement, methods [1]-[7] for restraining excessive change of brightness by clipping a histogram of an input image and dispersing the histogram concentrated in specific brightness value were proposed.

SAPHE(Self-Adaptive Plateau Histogram Equalization) [1] and MSAPHE(Modified SAPHE)[2] chose clipping threshold as the median of local maxima of an input histogram, and modified the histogram by clipping exceeded part of the histogram, and performed equalization by using the modified histogram.

In BUBOHE(Histogram Equalization with Bin Underflow and Bin Overflow)[3], thresholds for upper limit, and lower limit are defined, and histogram equalization was performed by using a modified histogram after removing histogram which exceeds thresholds.

In WTHE(Weighted and Thresholded Histogram Equalization)[4], histogram which exceeds thresholds is removed like in BUBOHE, and the histogram equalization was performed after modifying the histogram by using normalized power law function for the histogram ranging between thresholds In GC-CHE(Gain-Controllable Clipped Histogram Equalization)[5] a method was proposed that histogram removed by clipping process is redistributed to overall brightness area according to global gain, and modified histogram is made by redistributing additionally to bright area and dark area according to local gain.

In BHEPL (Bi-Histogram Equalization with a Plateau Limit)[6], in order to maintain an average brightness value of an input image, a histogram is divided into two brightness areas based on the average value of the input image, and then histogram equalization is performed by clipping independently for the respective area.

In QDHE (Quadrants Dynamic Histogram Equalization) [7], an input histogram is divided into quarters based on frequency of brightness of an input image, the range of an output brightness value of each area is determined according to the number of pixels contained in the area of each histogram, and then equalization is performed by using histogram which was clipping-processed independently for each area.

The histogram equalization methods based on clipping described above have the effect restraining occurrence of over-enhancement and false contouring. But the effect of contrast improvement is decreased and also unnatural images are acquired by failing to maintain the characteristic of an input image because the characteristic of the histogram is not considered and the same threshold is applied to the overall histogram.

[1] Bing-Jian Wang, Shang-Qian Liu, Qing Li, and Hui-Xin Zhou, "A real-time contrast enhancement algorithm for infrared images based on plateau histogram", Infrared Physics & Technology, vol. 48, no. 1, pp. 77-82, April 2006.

[2] Nicholas Sia Pik Kong, Haidi Ibrahim, Chen Hee Ooi, and Derek Chan Juinn Chieh, "Enhancement of microscopic images using modified self-adaptive plateau histogram equalization", submitted for publication in Proceedings of 2009 International Conference on Graphic and Image Processing (ICGIP 2009), Kota Kinabalu, Malaysia, November 2009.

[3] Seungjoon Yang, Jae Hwan Oh, and Yungfun Park, "Contrast enhancement using histogram equalization with bin underflow and bin overflow", In Image Processing, 2003. ICIP 2003. Proceedings. 2003 International Conference on, vol. 1, pp. 881-884, September 2003.

[4] Qing Wang, and Rabab K. Ward, "Fast image/video contrast enhancement based on weighted thresholded histogram equalization", IEEE Trans. Consumer Electronics, vol. 53, no. 2, pp. 757-764, May 2007

[5] Taekyung Kim and Joonki Paik, "Adaptive contrast enhancement using gain-controllable clipped histogram equalization", IEEE Trans. on Consumer Electronics, vol. 54, no. 4, pp. 1803-1810, November 2008.

[6] Chen Hee Ooi, Sia Pik Kong, Haidi Ibrahim, "Bi-Histogram Equalization with a Plateau Limit for Digital Image Enhancement", IEEE Transactions on Consumer Electronics, Vol. 55, No. 4, pp. 2072-2080, NOVEMBER 2009

[7] Chen Hee Ooi and Nor Ashidi Mat Isa, "Quadrants Dynamic Histogram Equalization for Contrast Enhancement", IEEE Trans. Consumer Electronics, vol. 56, no. 4, pp. 2543-2551, May 2010

DISCLOSURE

Technical Problem

In case that image contrast is increased by using a conventional histogram equalization method, excessive change of brightness results in over-enhancement, false contouring, and distortion by which detailed information of the image is eliminated. Especially, in case brightness distribution is concentrated in specific brightness level, the distortion is observed noticeably. Although improved equalization methods for modifying an input histogram by clipping histogram using threshold were proposed in order to solve these problems, the effect of contrast improvement is decreased and also unnatural images are acquired because the characteristic of the histogram is not considered, the same threshold is applied to the overall histogram, and the characteristic of an input image is not maintained.

Thus, the present invention is devised by considering the problems above, and the objective of the present invention is to provide an equalization apparatus which highly compresses a histogram of an input image having a brightness level with a high frequency and lowly compresses the histogram having a brightness level with relatively a low frequency, thereby maintaining the characteristics of the input image, while refraining excessive changes in brightness, and enhancing the contrast more effectively by controlling the strength of a compression ratio according to the characteristics of the input image.

Technical Solution

The present invention for accomplishing theses technical objectives relates to a histogram equalization apparatus using histogram compression. And the apparatus comprises a histogram calculation unit for calculating the histogram of an input image; a parameter determination module for determining a histogram compression ratio parameter $\lambda$ according to a brightness value of the input image or the characteristics of the histogram; a histogram transformation unit for compressing the input histogram according to the histogram compression ration parameter $\lambda$ determined by the parameter determination module so as to obtain a compressed histogram, obtaining a modified histogram, and calculating a cumulative distribution function of the modified histogram; and a histogram equalization unit for performing a histogram equalization by obtaining a modified histogram equalization map.

Advantageous Effects

According to the present invention as set forth above, appropriate level of contrast improvement is controlled according to the characteristic of the input image with refraining distortion such as loss of the detailed information of an image, false contouring, and over-enhancement caused by excessive change of brightness which occurred in conventional histogram equalization methods. Thereby it has the effect of providing a clean image naturally improved in contrast even with the characteristic of the input image maintained. Accordingly, the present invention is applicable to various application field of image-process demanding contrast improvement of images, such as high-resolution monitoring system, image black box for automobiles, and TV display, and multimedia terminal, and etc.

DESCRIPTION OF THE REFERENCE NUMERALS IN THE DRAWINGS

Figure 1:
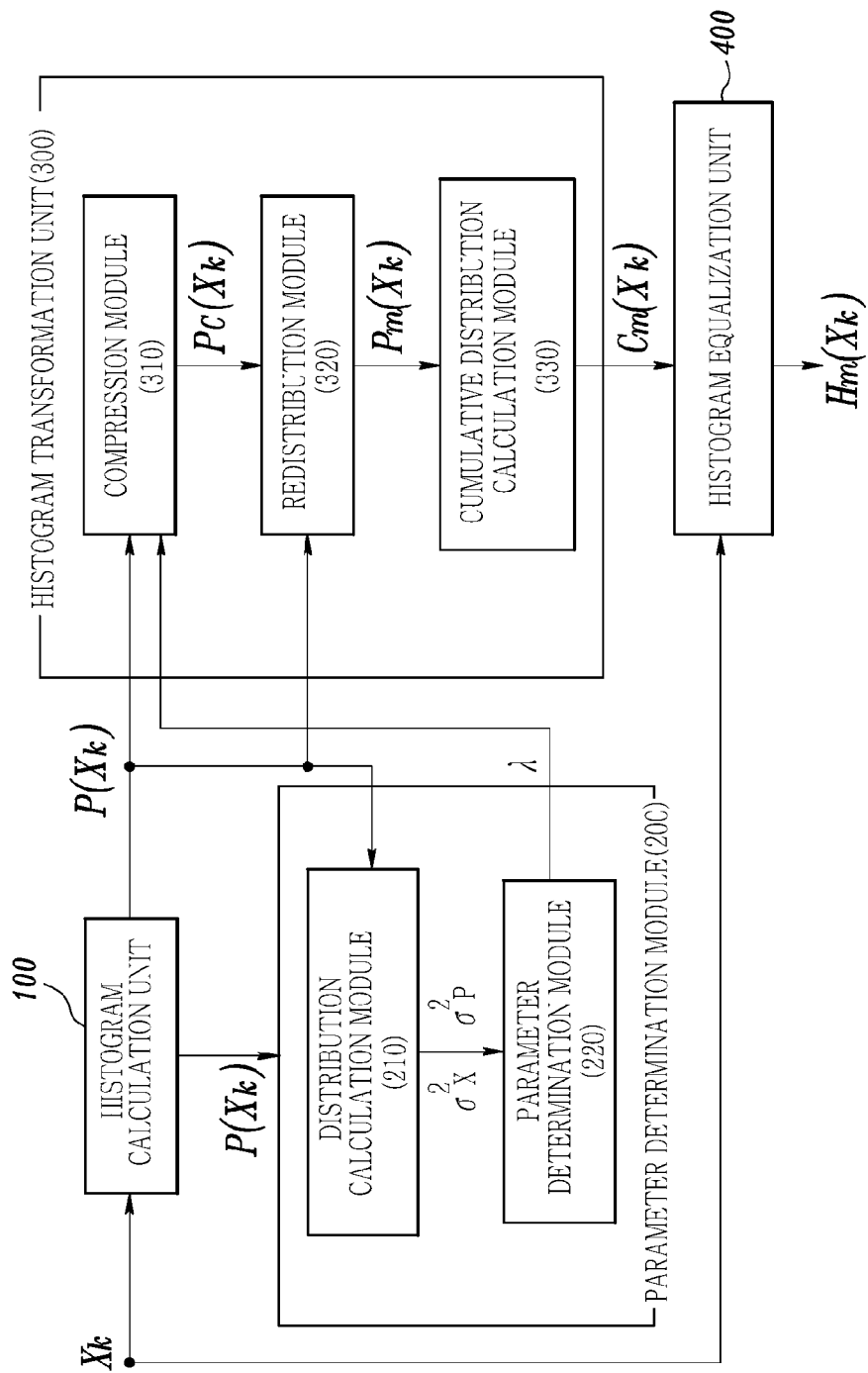
FIG. 1 illustrates an overall diagram of a histogram equalization apparatus using histogram compression according to the present invention.

100: histogram calculation unit
200: parameter determination module
300: histogram transformation unit
400: histogram equalization unit
210: distribution calculation module
220: parameter determination module
310: compression module
320: redistribution module
330: cumulative distribution calculation module
$X_k$: k-th brightest brightness value of an input image
$P(X_k)$: histogram (frequency) distribution function of an input image
$C(X_k)$: cumulative distribution function of histogram of an input image
T: average frequency of histogram of an input image
$\lambda$: parameter determining compression ratio
$\delta^2 X$: variance of a brightness value of an input image
$\delta^2 P$: variance of a histogram of an input image
$H(X_k)$: histogram equalization mapping function(brightness value of the result of histogram equalization for $X_k$, brightness value of an input image
$\Delta H(X_k)$: brightness increase of the image processed by histogram equalization in case input brightness value is increased one step from $X_{k-1}$ to $X_k$.

Best Mode

Specific features and advantages of the present invention will be more clearly understood from the following detailed description when taken in conjunction with the accompanying drawings. In case functions related to the present invention and specific description for the configuration unnecessarily obscure the gist of the present invention, it is noticed that the specific description will be omitted.

Hereinafter, with reference to the accompanying drawings, the present invention is described in details.

Figure 2A:
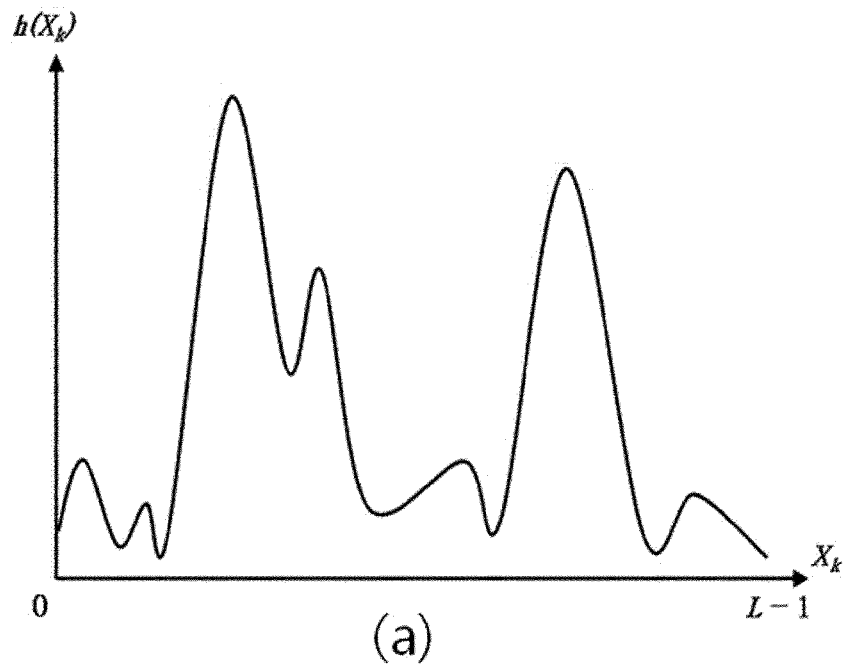
FIG. 2a and FIG. 2b illustrate an exemplary embodiment showing histogram modification by histogram compression and redistribution according to the present invention.
Figure 2A:
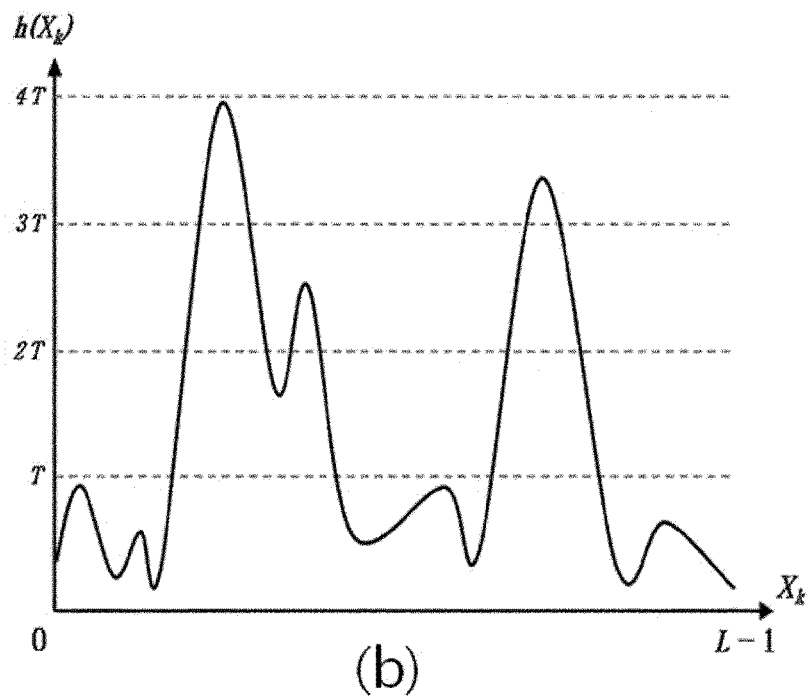
Figure 2B:
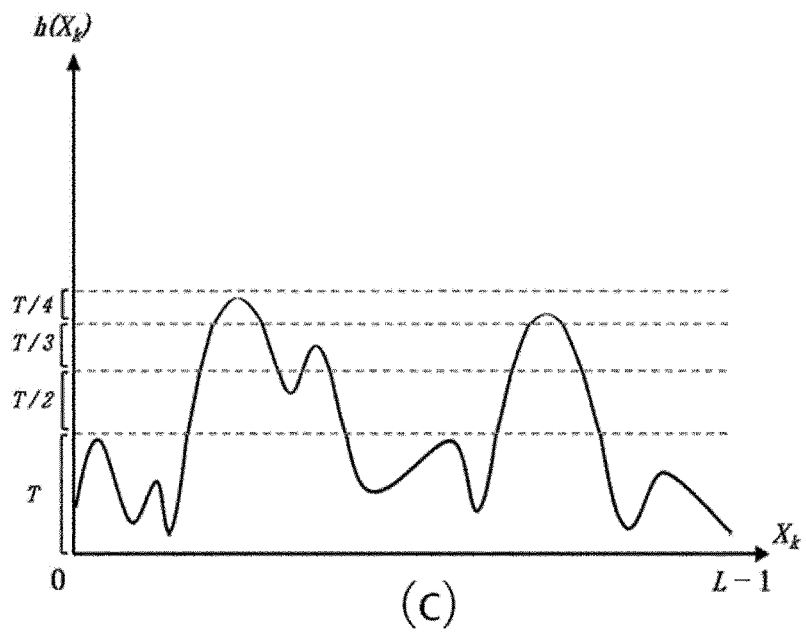
Figure 2B:
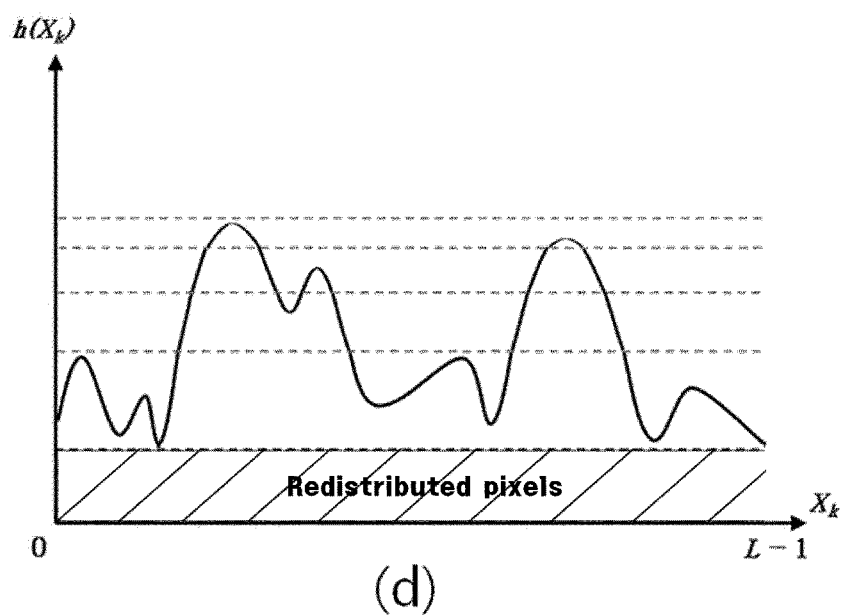
Figure 3:
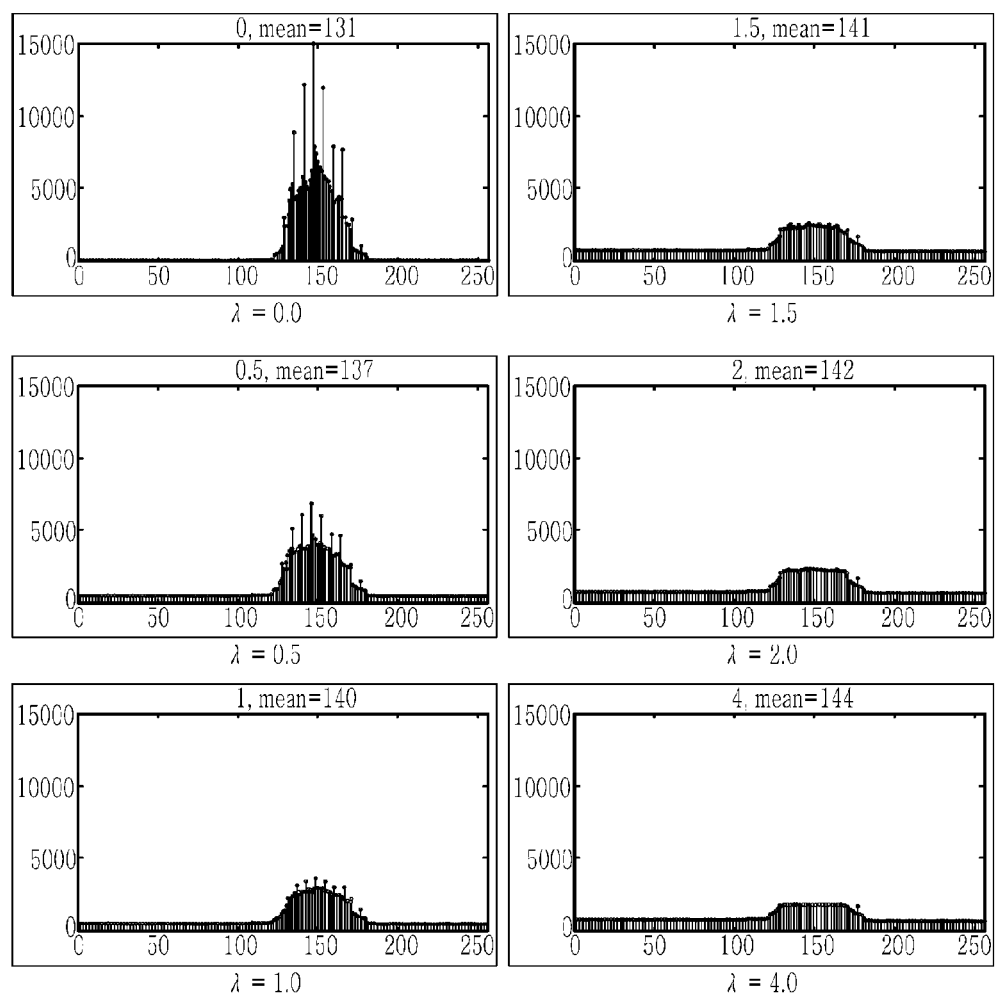
FIG. 3 illustrates an exemplary embodiment showing the result of histogram compression simulation according to compression ratio parameter according the present invention.

With reference to FIGS. 1 to 3, a histogram equalization apparatus using histogram compression is described as follows.

Histogram equalization is an efficient and representative algorithm for contrast improvement. But in case a histogram equalization method is applied to a lopsided image, distortion such as over-enhancement In order to solve the problems occurring in the conventional methods, the present invention proposes an equalization apparatus which highly compresses a histogram of an input image having a brightness level with a high frequency and lowly compresses the histogram having a brightness level with relatively a lower frequency, thereby maintaining the characteristics of the input image, while refraining excessive changes in brightness, and enhancing the contrast more effectively by controlling the strength of a compression ratio according to the characteristics of the input image.

FIG. 1 is an overall diagram of a histogram equalization apparatus using histogram compression according the present invention, comprising a histogram calculation unit 100, a parameter determination module 200, a histogram transformation unit 300, and a histogram equalization unit 400 as illustrated.

A histogram calculation unit 100 calculates a histogram of an input image($P(X_k)$) and CDF(Cumulative Distribution Function) ($C(X_k)$) as [Equation 1] and [Equation 2].

$$P(X_k) = \frac{n_k}{N}, k = 0, 1, \ldots, K-1 \quad \text{[Equation 1]}$$

$$C(X_k) = \sum_{i=0}^{k} P(X_i), k = 0, 1, \ldots, K-1, \quad \text{[Equation 2]}$$

wherein N is the number of whole pixels of an input image, K is the number of expressible brightness value, K=256 in case of a 8 bit digital image, and $n_k$ is the number of pixels corresponding to $X_k$, contrast level.

In addition, the histogram calculation unit 100 can acquire a mapping function for histogram equalization as [Equation 3] by using a cumulative distribution function ($C(X_k)$) obtained from [Equation 2]. That is, if brightness of an input pixel is $X_k$, image brightness processed by histogram equalization becomes $H(X_k)$.

$$H(X_k)=(K-1)\times C(X_k), k=0,1,\ldots,K-1 \quad \text{[Equation 3]}$$

In case brightness of an input image is increased one step according to [Equation 3], brightness increase quantity of an image processed by histogram equalization shown in [Equation 4].

$$\Delta H(X_k)=H(X_k)-H(X_{k-1})=(K-1)\times P(X_k) \quad \text{[Equation 4]}$$

It can be seen from [Equation 4] that $\Delta H(X_k)$ brightness change of an image processed by histogram equalization is proportional with histogram of the input image from [Equation 4]. If a specific histogram has a high number of occurrences, excessive change of brightness is generated and thereby over-enhancement or false contouring is caused. On the other hand, brightness value corresponding to a histogram with a low number of occurrences is merged with neighboring brightness value and loses information of small area of an image. In the present invention, histogram equalization is performed by using modified histogram after performing histogram modification by histogram compression in order to solve this problem.

For histogram modification by histogram compression, determination of compression ratio parameter $\lambda$ has considerable influence on image quality of the result. Considering contrast improvement and occurrence of distortion, it is appropriate to set compression ratio parameter $\lambda$ high for an image with contrast high enough. On the contrary, it is appropriate to set compression ratio parameter $\lambda$ low for an image with very low contrast.

Thus, the parameter determination module 200 determines a histogram compression parameter $\lambda$ according to brightness value of an input image or characteristic of a histogram, and comprises a variance calculation module 210 and a parameter determination module 220.

More specifically, the variance calculation module 210 calculates the variance of an input image brightness value as shown in [Equation 5] or the variance of an input histogram as [Equation 6] as the criteria for judging contrast and visibility by using $P(X_k)$, the histogram calculated by the histogram calculation unit 100.

$$\sigma^2 x = \sum_{i=0}^{K-1} (X_i - m)^2 \cdot P(X_i) \quad \text{[Equation 5]}$$

$$m = \sum_{i=0}^{K-1} X_i \cdot P(X_i)$$

$$\sigma^2 p = \frac{1}{K}\sum_{i=0}^{K-1} (P(X_i) - T)^2 \quad \text{[Equation 6]}$$

The parameter determination module 220 determines a histogram compression ratio parameter, $\lambda$ based on histogram variance or brightness value variance calculated by the variance calculation module 210.

At this time, the image with large variance of brightness value of an input image of [Equation 5] has visually large sharpness. Thus, equalization is not effective but there can be rather distortion due to equalization. It is desirable to set a compression ratio $\lambda$ to a large value.

Also, distortion by over-enhancement or false contouring is more likely to occur because the brightness change of an equalized image is large in case histogram variance of [Equation 6] is large. Thus, the compression ratio parameter, $\lambda$ is preferably set to a large value.

From the experiments, the appropriate range of the compression ratio parameter, $\lambda$ is [0.5~2]. And in case the judging criteria of [Equation 5] or [Equation 6] is large, the compression ratio parameter, $\lambda$ should be designed to be a large value. In case the judging criteria are small, the compression ratio parameter, $\lambda$ should be designed to be a small value.

The histogram transformation unit 300 obtains $P_c(X_k)$, compressed histogram by processing compression of an input histogram according to histogram compression ratio parameter, $\lambda$, obtains modified histogram $P_m(X_k)$, and calculates $C_m(X_k)$, comprises a compression module 310, a redistribution module 320, and a cumulative distribution module 330.

Specifically, the compression module 310 obtains a compressed histogram, $P_c(X_k)$ as [Equation 7] by using a histogram compression ratio parameter $\lambda$ determined by the parameter determination module 200 and a histogram $P(X_k)$ calculated by the histogram calculation unit 100.

$$P_c(x_k) = \begin{cases} P(X_k), & l < 1 \\ \sum_{i=1}^{l} \frac{1}{i^\lambda} \times T + \frac{1}{(l+1)^\lambda} \times (P(X_k) - l \times T), & l \geq 1 \end{cases} \quad \text{[Equation 7]}$$

wherein $l=[h(X_k)/T]$ means dividing $h(X_k)$ by an average number of occurrences T, and the average number of occurrences T equals to a value dividing the number of overall pixels of an input image by the number of brightness value K.

$$T = \frac{1}{K}\sum_{i=0}^{K-1} P(X_i) = \frac{N}{K} \quad \text{[Equation 8]}$$

In [Equation 7], the degree of histogram compression is determined by the parameter Å determining a compression ratio. In case $\lambda$=0, histogram compression is not performed such that $P_c(X_k)=P(X_k)$. In case $\lambda$ is considerably large, it will be similar with the result of clipping process.

Thus, the smaller the parameter ($\lambda$) is, the more the contrast effect will be improved, but distortion is more likely to occur.

On the contrary, as the parameter (λ) gets larger, distortion due to contrast enhancement is decreased, but the improvement effect of contrast is decreased.

FIG. 2a and FIG. 2b are exemplary embodiments, (a) of FIG. 2a illustrates a histogram of an input image, $P(X_k)$, and (b) illustrates interval division showing interval divided by average frequency, T unit.

(c) of FIG. 2b illustrates the compression result of histogram for each interval, and is an example of histogram obtained by performing compression by ½, ⅓, ¼, ... for each interval. And (d) shows a finally modified histogram obtained by redistributing constantly the total disappearance of the histogram during the compression process for all levels.

FIG. 3 is an exemplary embodiment showing a histogram modified by compression according to compression determination parameter λ. In case λ=0, the result is identical to the input histogram. And it can be seen that as λ is growing larger, the result gets similar with a histogram clipping-processed in shape.

The redistribution module 320 performs compression process by the compression module 310 before it obtains the modified histogram by redistributing the number of lost pixels (the frequency brought by subtracting compressed histogram from the input histogram) equally for all brightness levels as shown in (d) of FIG. 2b.

That is, the redistribution module 320 outputs a modified histogram $P_m(X_k)$ by adding difference of $P(X_k)$ histogram calculated by the histogram calculation unit 100 and $P_c(X_k)$ histogram compressed by the compression module 310, to the compressed histogram as shown in [Equation 9].

$$P_m(X_k) = P_c(X_k) + \frac{1}{K}\sum_{i=0}^{K-1}(P(X_i) - P_c(X_i)) \quad \text{[Equation 9]}$$

Such redistribution process can suppress a phenomenon that the brightness value corresponding to the histogram of very small frequency is removed by equalization.

The cumulative distribution calculation module 330 calculates $C_m(X_k)$, cumulative distribution function by [Equation 10] for $P_m(X_k)$, histogram modified by the redistribution module 320.

$$C_m X_k \sum_{i=0}^{k} P_m(X_i), k = 0, 1, \ldots, K-1 \quad \text{[Equation 10]}$$

The histogram equalization unit 400 obtains a modified histogram map, and performs histogram equalization. Specifically, the histogram equalization unit 400 obtains the histogram equalization map by operation of K, the number of brightness value and $C_m(X_k)$, the cumulative distribution function as shown in [Equation 11], applies pixels of the input image to the histogram equation map to output $H_m(X_k)$, the brightness of an output pixel.

That is, in case the brightness of the input image is $X_k$, the brightness of the image of which histogram is equalized is $H_m(X_k)$.

$$H_m(X_k)=(K-1)\times C_m(X_k), k=0,1,\ldots,K-1 \quad \text{[Equation 11]}$$

Although the present invention has been described in conjunction with the preferred embodiments which illustrate the technical spirit of the present invention, it will be apparent to those skilled in the art that the present invention is not limited only to the illustrated and described configurations and operations themselves but a lot of variations and modifications are possible without departing from the scope of the spirit of the invention. Accordingly, all of appropriate variations, modifications and equivalents are considered to pertain to the scope of the present invention.

What is claimed is:

1. A histogram equalization apparatus using histogram compression, comprising:
   a histogram calculation processor calculating a histogram $P(X_k)$ of an input image;
   a variance calculation processor calculating a histogram variance $\sigma^2 P$ of the input image or a brightness value variance $\sigma^2 X$ of the input image, by using the histogram $P(X_k)$ calculated by the histogram calculation processor;
   a parameter determination processor determining a histogram compression ratio parameter λ according to the histogram variance $\sigma^2 P$ or the brightness value variance $\sigma^2 X$ of the input image calculated by the variance calculation processor;
   a histogram transformation processor compressing the histogram $P(X_k)$ according to the histogram compression ratio parameter λ determined by the parameter determination processor, obtaining a compressed histogram $P_c(X_k)$, obtaining a modified histogram $P_m(X_k)$, and calculating a cumulative distribution function $C_m(X_k)$ of the modified histogram; and
   a histogram equalization processor performing a histogram equalization by obtaining a modified histogram equalization map,
   wherein the brightness value variance, $$\sigma^2 x = \sum_{i=0}^{K-1}(X_i m)^2 \cdot P(X_i)$$

here, $$m = \sum_{i=0}^{K-1} X_i \cdot P(X_i),$$

i represents an integer, K represents a number of expressible brightness value, and $X_i$ represents a brightness of an i-th input pixel, and
wherein the histogram variance, $$\sigma^2 p = \frac{1}{K}\sum_{i=0}^{K-1}(P(X_i) - T)^2,$$

here, T represents an average frequency of the histogram of the input image.

2. The histogram equalization apparatus using histogram compression according to claim 1, wherein the parameter determination processor determines the histogram compression ratio parameter λ depending on the histogram variance $\sigma^2 P$ and the brightness value variance $\sigma^2 X$ of an input image.

3. The histogram equalization apparatus using histogram compression according to claim 1, wherein the histogram transformation processor comprises:
   a compression processor obtaining the compressed histogram $P_c(X_k)$ by using the histogram compression ratio parameter λ determined by the parameter determination processor and the histogram $P(X_k)$ calculated by the histogram calculation processor;

a redistribution processor obtaining the modified histogram parameter $Pm(X_k)$ by redistributing a number of lost pixels equally for all brightness levels; and a cumulative distribution processor calculating the cumulative distribution function $C_m(X_k)$ for the modified histogram $P_m(X_k)$ modified by the redistribution processor, wherein the compressed histogram, $$P_c(x_k) = \begin{cases} P(X_k), & l < 1 \\ \sum_{i=1}^{l} \frac{1}{i^\lambda} \times T + \frac{1}{(l+1)^\lambda} \times (P(X_k) - l \times T), & l \geq 1 \end{cases}$$

here, $l = [h(X_k)/T]$ and the average frequency T equals to a value dividing a total number of pixels N of the input image by the number of expressible brightness values K.

4. The histogram equalization apparatus using histogram compression according to claim 3, wherein the redistribution processor outputs the modified histogram $P_m(X_k)$ by adding a sum of differences between the histogram $P(X_k)$ and the compressed histogram $P_c(X_k)$, to the compressed histogram $P_c(X_k)$.

5. The histogram equalization apparatus using histogram compression according to claim 1, wherein the histogram equalization processor obtains the modified histogram equalization map by using the number of expressible brightness values K and the cumulative distribution function $C_m(X_k)$ and outputs a brightness of an output pixel $H_m(X_k)$ by applying a total number of pixels N of the input image to the modified histogram equalization map.

6. The histogram equalization apparatus using histogram compression according to claim 1, wherein the parameter determination processor determines the histogram compression ratio parameter $\lambda$ depending on the histogram variance $\sigma^2 P$ and the brightness value variance $\sigma^2 X$ of an input image.

7. The histogram equalization apparatus using histogram compression according to claim 1, wherein $$P(X_k) = \frac{n_k}{N}, k = 0, 1, \ldots, K - 1,$$

here, $n_k$ represents a number of pixels corresponding to a contrast level $X_k$, and N represents a total number of pixels of the input image.

* * * * *